United States Patent

Shiber

[11] 3,813,129

[45] May 28, 1974

[54] ANTISKID CONTROL SYSTEM

[76] Inventor: Samuel Shiber, P.O. 302, Des Plaines, Ill. 60018

[22] Filed: July 11, 1972

[21] Appl. No.: 270,710

[52] U.S. Cl............ 303/21 B, 188/181 C, 200/80 R
[51] Int. Cl................................................ B60t 8/08
[58] Field of Search... 188/181; 200/61.45 R, 61.46, 200/80 R; 303/20, 21 CG, 21 B, 21 BE, 24 A

[56] References Cited
UNITED STATES PATENTS

| | | | |
|---|---|---|---|
| 2,379,289 | 6/1945 | Farmer | 303/21 B |
| 3,359,042 | 12/1967 | Dave | 303/21 BB |
| 3,336,244 | 1/1968 | Mueller | 303/21 BB |
| 3,649,083 | 3/1972 | Depenheuer | 303/21 B |
| 3,701,568 | 10/1972 | Lewis | 303/21 P |

*Primary Examiner*—Trygve M. Blix
*Assistant Examiner*—Stephen G. Kunin

[57] ABSTRACT

A vehicular antiskid control system comprising an inertia wheel whose rotational speed represents a computed vehicle speed, driven by a shaft coupled to at least one of vehicle's wheels, through a one-way clutch, braking device to decelerate the inertia wheel in a deceleration which corresponds to vehicle's deceleration and device to divide the shaft's rotational speed by the rotational speed of said inertia wheel and issues a command when the quotient is below a certain numerical value.

5 Claims, 4 Drawing Figures

PATENTED MAY 28 1974 3,813,129
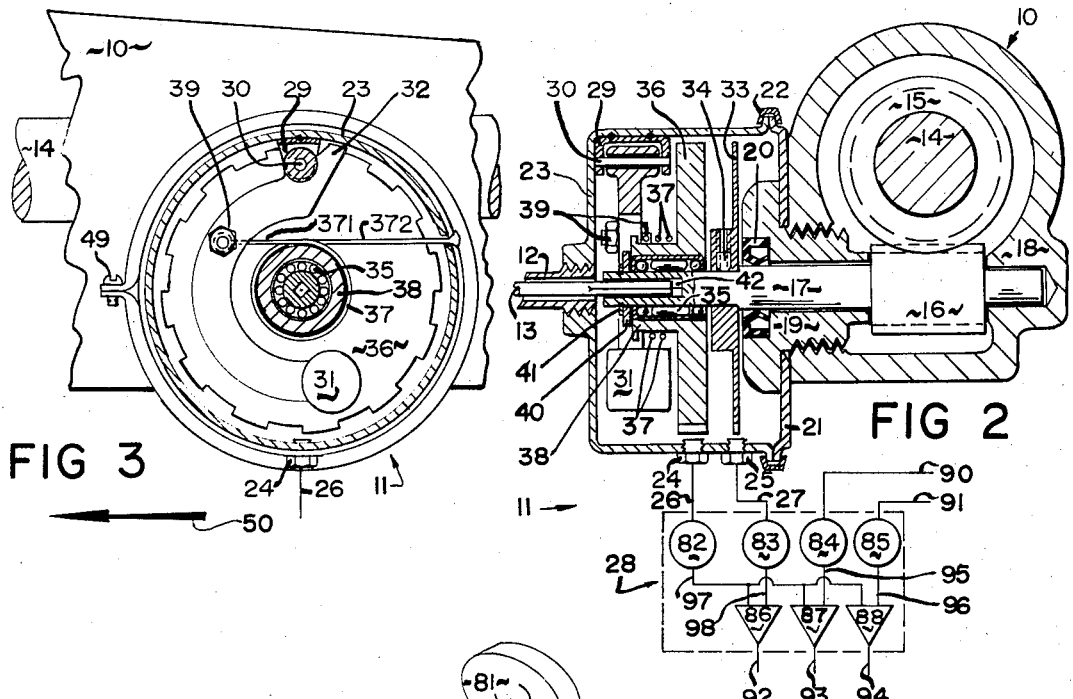
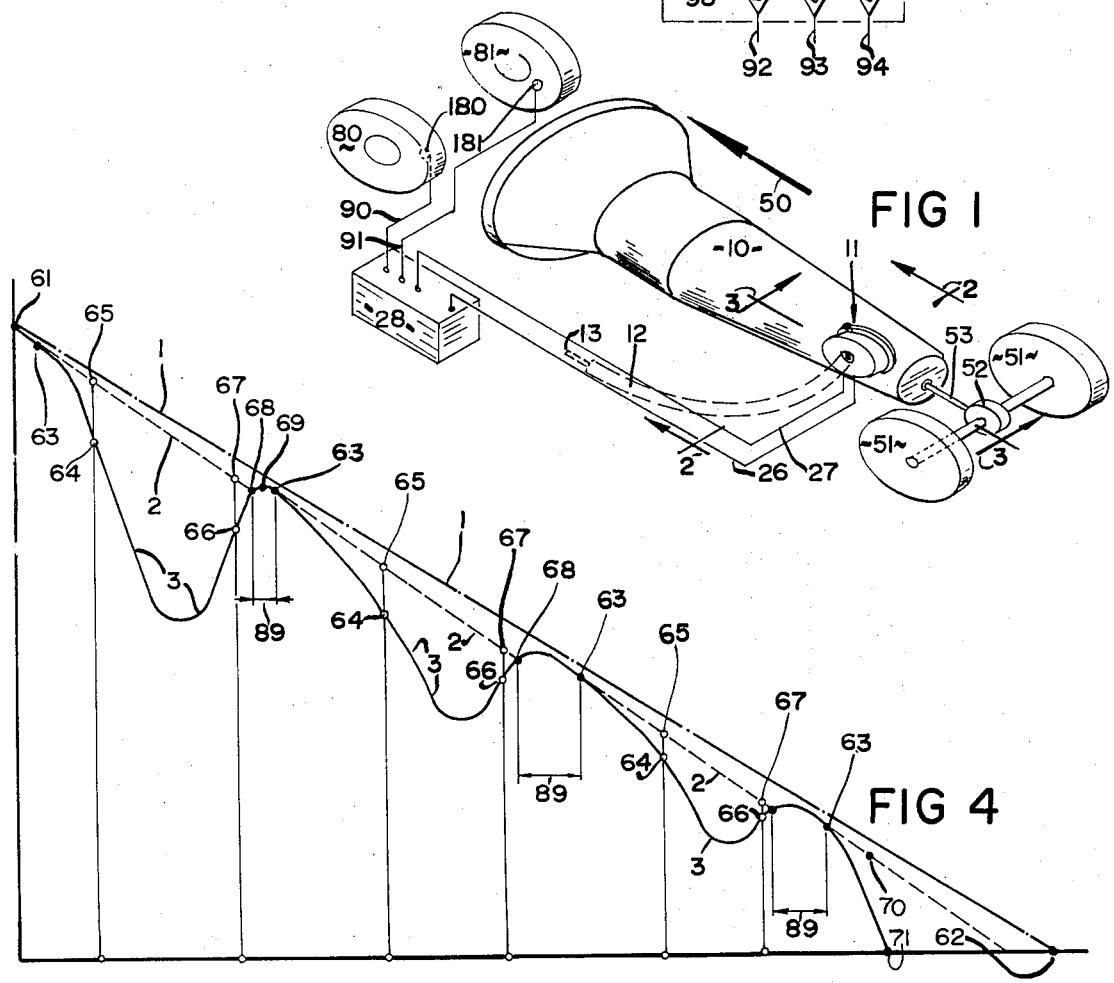

ANTISKID CONTROL SYSTEM

SUMMARY AND BACKGROUND

In a modern vehicle the operator can usually generate, through the brake system, sufficient braking torque to lock the vehicle's wheels. A moving vehicle with locked wheels has inferior directional stability and controlability and it has been established that limiting the wheel's slip (slip is the ratio between vehicle's speed minus wheel's tangential speed divided by vehicle's speed) can improve the vehicle's braking characteristics.

One approach to the design of such a system (this system is often referred to as "Antiskid" or "Antilock" System) consists of two major sub-systems:
  a. An antiskid control which issues commands to prevent the wheels from entering an excessive slip condition,
  b. modulating means which receive these commands and regulate the braking torque at the wheels accordingly.

An object of the present invention is to provide simple and reliable Antiskid Control that could issue either an on-off command or a proportional command to modulating means that regulate the braking torque at vehicle's wheels in order to prevent the wheels from entering an excessive slip condition.

Another object of the invention is to design a logic that will utilize one computation to decide when to start and when to stop issuing this command.

Another object of the invention is to enable the designer to construct the logic's circuitry that issues the commands to do so by comparing which one of two signals is larger, one representing a mechanically computed vehicle speed and the other representing a vehicle's wheel speed.

Another object of the invention is to offer a simple mechanical computation of vehicle's speed with means to calibrate it during every "cycle" of releasing and reapplying the braking torque at the wheels.

BRIEF DESCRIPTION OF THE FIGURES

FIG. 1 shows an antiskid control mounted to a vehicle's transmission at a point where originally the speedometer cable was connected to it. This speedometer cable is shown connected to the antiskid control, therefore, in essence, the antiskid control has been inserted into the speedometer drive-line, FIG. 2 shows a cross-sectional rear-view of the antiskid control taken along line 2—2 marked on FIG. 1, FIG. 3 shows a cross-sectional side view of the antiskid control taken along the line 3—3 marked on FIG. 1, FIG. 4 shows a plot of vehicle's true speed; vehicle's computed speed and wheel's speed on the vertical scale plotted against time on the horizontal scale.

DETAILED DESCRIPTION OF THE FIGURES

FIG. 1 shows an automotive transmission 10 to which an antiskid control 11 is attached and from which an ordinary speedometer cable having an outer jacket 12 and a flexible shaft 13 continues to a vehicle's speedometer (not shown). Sensors 180 and 181 monitor the rotational speed of wheels 80 and 81 and transmit the information to a logic 28 via wires 90 and 91, respectively. Wires 26 and 27 also transmit information, from the unit 11 to the logic 28. Drive line 53 transmits power from the transmission 10 to wheels 51 via a conventional automotive differential 52.

FIGS. 2 and 3 show a cross-section of the antiskid control 11 attached to the transmission 10 at a place where usually the speedometer cable connects to it. Thus, a transmission output shaft 14 normally carries a gear 15 with which a gear 16 meshes. The gear 16 is integral with a shaft 17 which is rotatably supported by the transmission housing 18 and by a bolt 19 which carries a seal 20 and which also fastens a plate 21 to the transmission housing 18. A tightening band 22 which is tightened by a screw 49 attaches a cover 23 to the plate 21. The cover 23 supports sensors 24 and 25 which are connected via wires 26 and 27 to a logic 28. A "U" shaped bracket 29 is welded to the cover 23 and supports a shaft 30 which pivotly supports a pendulum 31 which is limited in its backward movement by a tooth 32 abutting against the cover 23. A reference toothed wheel 33 is secured by a set screw 34 to the shaft 17 which also carries a one-way clutch and ball bearing assembly 35 which is press fitted in a hub of a toothed inertia wheel 36. A friction cable 37 which is wraped several times over a collar 38 of the inertia wheel 36 is anchored to the pendulum by a bolt assembly 39 at one end and to the cover 23 at its other end. A washer 40 and a snap ring 41 prevent the inertia wheel 36 from sliding off the shaft 17. The end of the outer speedometer cable jacket 12 is threaded into the cover 23, and the flexible shaft 13 has a square end which fits in a square hole 42 formed in the end of the shaft 17.

OPERATION: When a vehicle moves normally in a forward direction, indicated by arrows 50 on FIGS. 1 and 3, the reference wheel 33 rotates at a proportional speed, which is proportional to the instantaneous average rotational speed of the (rear) wheels 51, because the reference wheel 33 is affixed to the shaft 17 which is affixed to the gear 16 which is meshed with the gear 15 which is affixed to the shaft 14 which is coupled to the drive-line 53 which is coupled to the differential 52 which is coupled to the wheels 51 averaging their rotational speed.

The one-way clutch and ball bearing 35 positively locks the inertia wheel 36 to the shaft 17 whenever the shaft 17 attempts to rotate faster than the inertia wheel 36 (all rotational directions correspond to the previously assumed forward movement of the vehicle), but allows the inertia wheel 36 to rotate faster than the shaft 17, while creating a certain residual drag torque between the two parts that slightly brakes the inertia wheel 36.

The pendulum 31 pivoting axis, shaft 30, is perpendicular to the vehicle's longitudunal axis. When the pendulum is subjected to the vehicle's deceleration along its longitudunal axis it attempts to swing forward, but after a slight movement it tenses the flexible (but unstretchable) elongated friction element, friction cable 37 which is preferably a wire rope. Thus the tension in the first part of the cable 371 corresponds to the product of the pendulum's mass multiplied by the above mentioned vehicle's rate of deceleration.

The tension in the second part of the cable 372 equals the tension in the first part 371 multiplied by a factor $(3^{-\mu\alpha})$, where;

$e$ = natural base of logarithms $u$ = the coefficient of friction between the friction cable 37 and the collar 38

$a$ = the angle of contact between the friction cable 37 and the collar 38 expressed in radians.

The friction cable 37 is warped several times around the collar 38 in a self-de-energizing direction, and every revolution contributes 6.28 radians to the angle of contact $a$.

The friction cable 37 exerts on the inertia wheel 36 a braking torque which equals to the product of the tension in the first part of the cable 371 minus the tension in the second part of the cable 372 multiplied by the radius of the collar 38. If the friction cable is warped around the collar 38 a sufficient number of times, the tension in the second part of the cable 372 will equal to a very small percentage of the tension in the first part of the cable 371, therefore, variation in the tension of the second part of the cable will be insignificant relative to the braking torque that the cable exerts on the inertia wheel 36.

This arrangement of the cable 37 and the collar 38 can be categorized as a self-de-energizing system. The important characteristic of this system is that it is a friction mechanism that is practically independent of the numerical value of the coefficient of friction in it, as far as the ratio between the energizing force input that is fed into it and the resulting braking torque that it generates, therefore it maintains the same linear relatioship between the input force and the resulting torque when the coefficient of friction changes due to changes in the air's humidity or self polishing of the parts 37 and 38, etc.

Various configurations of self-de-energizing mechanisms can be arrived at by taking a self-energizing brake mechanism and using its original anchoring point for an energizing force input, and using its original energizing force input point as an anchoring point.

As discussed previously, when the vehicle moves normally, in a forward direction, the inertia wheel 36 and the reference wheel 33 will rotate in unison at a proportional speed, proportional to the instantaneous average speed of the wheels 51, therefore, proportional to the vehicle true (ground) speed.

To clarify this discussion, it should be noted that the term "normally" refers to a forward movement of the vehicle when the vehicle is either coasting or moves under its own power while little or no slip between its wheels 51 and the road takes place.

When the wheels 51 decelerates; the drive line 53, the shaft 14, the shaft 17, and reference wheel 33 all decelerates at a corresponding angular deceleration.

I will refer now to the FIGURES including FIG. 4 and continue to explain the operation of the system in relation to it. The horizontal scale on FIG. 4 is a time basis and it has a common origin with the vertical scale at their intersection point. The vertical scale is a speed scale; vehicle's true (ground) speed indicated by line 1, vehicle's computed (ground) speed indicated by curve 2 and that of the wheel's 51 instantaneous average tangential speed indicated by curve 3.

As can be seen, the braking process starts at a point 61 and the vehicle's ground speed 1 decreases uniformly until the vehicle come to a stop, at a point 62. The vehicle's wheels 51 also start to decelerate (by vehicle wheel's deceleration it is meant the average tangential deceleration of the wheels 51) at the point 61 at a slightly greater rate than the vehicle, and the inertia wheel 36 decelerate together with the wheel 33 down to point 63, where the inertia wheel continues to rotate at a speed which represents the vehicle computed speed shown by the curve 2, and the wheels 51 decelerate more rapidly along line 3. At a certain point 64 the ratio between the wheel's speed 64 divided by the calculated vehicle speed 65 decreased below a predetermined threshold level of .9, and the logic 28 responds by issuing a command to decrease the braking torque applied at the wheels 51. Thereby, after some delay which results in a certain overshoot, it allows the wheels to decelerate until at a point 66 the wheels speed exceed .9 of the calculated vehicle speed 67 and at this point the logic 28 allows reapplication of the braking torque at the wheels 51 by dicontinuing the previously issued command, however, again, there is a certain delay involved in the application of the braking torque at the wheels 51, and due to the specific characteristics of the relationship between the coefficient of friction between road and tire versus slip between the road and tire, the wheels' speed will climb and reach the true vehicle speed within several percent, usually within less than 5 percent. Thus, at a point 68 the wheels' speed may tend to exceed the computed ground speed which in terms of hardware means that the speed of the shaft 17 will try to exceed the speed of the inertia wheel 36, but this, as explained before, is not permitted by the one-way clutch and ball bearing assembly 35 which looks, causing the inertia wheel 36 to accelerate with the wheels 51 and with the shaft 17 to a point 69 thereby calibrating the computed vehicle speed to within several percent of the vehicle's true speed (point 69) in preparation for the next cycle.

Therefore, it can be said that the computed speed is calibrated every cycle of releasing and re-applying the brake during the period marked 89. At the end of the period 89, the wheel speed, curve 3, again separates from the computed vehicle speed, curve 2, when the wheels' deceleration exceeds by a certain threshold of approximately .1 g the vehicles deceleration, at which point the residual drag torque, mentioned previously, in the one-way clutch and ball bearings assembly 35 is overcome at the point of separation of these two curves and the begining of relative rotation between inertia wheel 36 and the shaft 17. Since this point in the new cycle is the same as the point 63 in the first cycle it is marked by the same numeral. Other equivalent points in this and in the next cycle are also marked by the same numeral as in the first cycle.

After the third cycle, and in the entrance to the fourth cycle, the calculated vehicle speed decreases to below a certain value, point 70, which causes the logic 28 to stop interferring with the braking process thereby allowing the wheels 51 to lock-up at a point in time marked 71. The wheels stay locked until the vehicle comes to a stop at the point in time marked 62. percent The monitoring of the rotational speed of the inertia wheel 36 and the reference wheels 33 is done by the sensors 24 and 25, respectively, these sensors that transmit information to the logic 28 through wires 26 and 27, respectively, are preferably, optical or electro magnetic sensors that sense the passage of the teeth that are formed on the periphery of the wheels 36 and 33, respectively. The rotational speeds of the wheels 80 and 81 are monitored by the sensors 180 and 181, respectively, and this information is transmitted to the logic 28 via wires 90 and 91, respectively. At the logic 28, the signals from wires 26, 27, 90, and 91 are translated by tachometers 82, 83, 84 and 85, respectively, to voltages that correspond to the speeds of the inertia wheel 36, the reference wheel 33, the front wheel 80 and the front wheel 81, respectively. The tachometers and their respective sensors are so biased that when the vehicle moves normally in a straight line, the voltage output of the tachometer 82 which is transmitted to comperator circuits 86, 87 and 88 through wire 97, equals 90 per cent of the voltage output of the tachometers 83, 84 or 85 which are transmitted by wires 98, 95 and 96 to the comperators 86, 87, and 88, respectively. Referring back to FIG. 4, at point 61 the voltage at wire 97 which represents the computed vehicle speed (curve 2) is 90 percent of the voltage in wire 98 which represents the average wheels 51 speed (curve 3) and the comperator 86 is designed not to issue a command as long as the voltage at wire 97 is lower than the voltage at wire 98.

However, as the braking process progresses and points 65 and 64 are passed by curves 2 and 3, respectively, wheels' speed sinks to below 90 percent of the computed vehicle speed, therefore, the voltage at the wire 97 sinks below the voltage at the wire 98 which causes the comperator 86 to issue a command via wire 92 to reduce the braking torque at the wheels 51. This command is maintained continuously, and is shut off only after the curves 2 and 3 have progressed passed the points 67 and 66, respectively.

Comperators 87 and 88 control in a similar manner by commands issued through wires 93 and 94 the front wheels 80 and 81, respectively, using the same computed vehicle speed in the form of the voltage in the wire 97 as a low speed threshold for either of these wheels.

This form of computation of logic 28 is considered advantageous economically since it achieves automatically a division of the wheel's speed by the computed car speed, and comparing it to a fixed numerical threshold of .9, merely by comparing which one of two voltages is higher, a function that can accurately and inexpensively be carried out by such popular electronic circuitry as a differential amplifier or similar components. Further, as it is shown the same circuitry and computation is used to decide when to release the braking torque at the wheels and when to re-apply it.

Some additional advantages that are realized with this Antiskid Control stem from the fact that the speed signal that is generated by the tachometer does not have to be differentiated or otherwise further processed, thus, its quality can be relatively "poor" and it will still serve its purpose which in turn is reflected in inexpensive sesors' construction, etc. The ratio of the computed vehicle speed to wheel's speed can also serve as a basis for a "proportional-command" where the modulating means are designed to utilize such a command.

As one familiar with antiskid logic containing decelerometer knows, distinguishing between a road gradient to a vehicle's deceleration is a problem. In airplanes or missiles when such a problem exists the deceleration sensor is often mounted on a platform which is stabilized in space by gyroscopes, however, this solution is obviously too expansive and delicate for usage on automobiles. Therefore, a satisfactory solution is found by biasing the deceleration signal, this is, biasing the braking torque exerted on the inertia wheel 36 to be slightly excessive, thereby causing the calculated vehicle speed 2 to be decreasing faster than true ground speed when the vehicle is decelerating on a horizontal road, so that when the vehicle is braking on an up-hill road, the computed vehicle speed, curve 2, will still be below or equal to the true vehicle speed, line 1.

This biasing of the deceleration signal to exceed its corresponding real value, on a flat road, and more so while braking on a down-hill road, is not detrimental since there is a calibration of the computed vehicle speed every cycle during the period marked 89 of FIG. 4, as explained before. One of the preferred ways of introducing the biasing of the deceleration signal into the system is by means of the residual drag torque in the one-way clutch and ball bearing 35 which introduces an artificial additional deceleration of about .1 g into the computation, as explained previously, when the inertia wheel 36 starts over-running over the shaft 17. Another function of this drag torque is that it keeps the inertia wheel rotating in unison with the shaft 17 and the reference wheel 33 when the drive slightly decelerates the vehicle in an amount that would not activate the pendulum 31 due to friction around the shaft 30, etc.

Another factor in the choice of this means for biasing the deceleration signal is that usually one-way clutches have a certain residual drag torque inherent in their design, and unless it is taken into account it may interfere with the vehicle speed computation, however, if the designer uses a one-way clutch that exerts no drag torque on the shaft 17 he may incline the pendulum 31 to create a braking torque between the friction cable 37 and the collar 38 that simulates a .1 g vehicle deceleration when the vehicle moves at an even speed on a flat road. This solution, however, is less desirable since this braking torque will be continuously effective when the vehicle is moving and will cause early wear of the friction cable 37 and the collar 38.

It is also to be noted that the system can be designed with the one-way clutch and ball bearing 35 exerting sufficient residual drag torque to cause an artificial deceleration of the inertia wheel 36 that will correspond to a vehicular deceleration of 1 g, therefore, enabling the designer to omit the pendulum 31 and the flexible elongated friction element, i.e., friction cable 37, however, this solution is considered inferior, performance wise, especially since it may cause untimely re-application of the braking torque at the wheels.

It should be noted that in vehicles that have no drive-lines, such as trailers, the shaft 17 may be driven by one of the vehicle's wheels directly. Further, one may have one unit driven by a wheel on the right side of the vehicle for controlling all wheels on the right side of the vehicle and a second unit driven by a wheel on the left side of the vehicle for controlling all the wheels on the left side of the vehicle, thereby avoiding any speed error while the vehicle moves alone a turn, although this can be avoided by using a single antiskid control driven by a left or a right wheel which will release the braking torque at the wheels when their speed will sink below 80 to 70 percent of the computed vehicle speed. In vehicles that do have a drive-line to which the shaft 17 can be coupled, this problem is minimized by the fact that usually the drive-line rotates at a speed which is proportional to the average speed of the right and left wheels it transmits power to.

1. A vehicular antiskid control system comprising a inertia wheel whose rotational speed represents a vehicle's computed speed, a shaft coupled to at least one of said vehicle's wheels rotating at a proportional speed, which is proportional to the speed of the wheels it is coupled to, one-way clutch means connecting said inertia wheel to said shaft preventing the shaft's rotational speed from exceeding the inertia wheel's rotational speed but enabling the inertia wheel's rotational speed to exceed the shaft rotational speed when said vehicle is moving in a forward direction, brake means for decreasing said inertia wheel's rotational speed in response to a deceleration of said vehicle, said brake means comprising a self-de-energizing friction mechanism which is energized by an inertial force of a mass which is subjected to the vehicle deceleration along its longitudinal axis, where said friction mechanism includes means for minimizing the effect of variations in the coefficient of friction in said friction mechanism on the ratio between said deceleration and the resulting decrease of said inertia wheel's rotational speed.

2. The structure of claim 1 where said friction mechanism comprises a flexible elongated friction element warped in a self-de-energizing direction around the inertia wheel having one of its ends tied to and energizable by a pendulum structure which is pivoted on an axis which is perpendicular to the vehicle's longitudinal axis, and its second end anchored to said vehicle's structure.

3. The structure as in claim 1 wherein said one-way clutch exerts a residual drag torque on said inertia wheel while said inertia wheel's rotational speed exceeds said shaft's rotational speed, while said vehicle is moving in a forward direction.

4. The structure of claim 1 with computing means for computing the quotient of inertia wheel's rotational speed divided by the shaft's rotational speed, and generating a command whenever this quotient is below a certain numerical value.

5. The structure of claim 4, where said computing means generate a first signal which corresponds to the rotational speed of said inertia wheel and a second signal which corresponds to the rotational speed of said shaft, said first signal being larger than said second signal when said inertia wheel rotates in unison with said shaft, said computing means issuing said command when said second signal becomes larger than said first signal.

* * * * *